(12) United States Patent
Bryant

(10) Patent No.: US 7,536,976 B1
(45) Date of Patent: May 26, 2009

(54) CATTLE FEEDING SYSTEM AND SHELTER TO CREATE A CONTROLLED ENVIRONMENT

(76) Inventor: Robert E. Bryant, 5969 V Ave., Aurella, IA (US) 51005

( * ) Notice: Subject to any disclaimer, the term of this patent is extended or adjusted under 35 U.S.C. 154(b) by 94 days.

(21) Appl. No.: 11/923,816

(22) Filed: Oct. 25, 2007

Related U.S. Application Data

(62) Division of application No. 11/370,971, filed on Mar. 8, 2006.

(51) Int. Cl.
*A01K 1/00* (2006.01)
(52) U.S. Cl. .................................. 119/448; 119/436
(58) Field of Classification Search ............. 119/51.01, 119/449, 436, 437, 444, 445, 448; 52/73; 49/71; 160/45; 135/117, 87, 121–122, 158
See application file for complete search history.

(56) References Cited

U.S. PATENT DOCUMENTS

| 596,804 | A | | 1/1898 | Busch |
|---|---|---|---|---|
| 2,626,591 | A | | 1/1953 | Mazur et al. |
| 2,842,096 | A | | 7/1958 | Bradfield |
| 3,885,524 | A | | 5/1975 | Gregory |
| 4,060,054 | A | * | 11/1977 | Blair ........................ 119/447 |
| 4,222,347 | A | | 9/1980 | Bunger |
| D262,826 | S | | 1/1982 | Bunger |
| 4,773,191 | A | | 9/1988 | Slack |
| 6,073,587 | A1 | | 10/2005 | Bryant |
| 2005/0235922 | A1 | | 10/2005 | Bryant |

\* cited by examiner

*Primary Examiner*—Son T. Nguyen
(74) *Attorney, Agent, or Firm*—McKee, Voorhees & Sease, P.L.C.

(57) ABSTRACT

An improved cattle feeding system and shelter. The shelter has a building foundation frame extending upwardly from the ground with an awning frame extending upwardly from the foundation frame and over it. This allows for an awning to be placed over the shelter frame to at least partially enclose it. The awning has a portion which is optionally opened to the south and optionally opened to the north to selectively allow air ventilation or catching the warmth of a southern sun exposure. The awning also has a portion that can extend outwardly to the south, as well as retract. Vertically extendable and retractable awning closures are over the east and west ends of the frame to form selective entrances and exits. The entire system is built on a partial cement floor of a configuration which enhances cleanliness inside of the shelter.

5 Claims, 7 Drawing Sheets

CATTLE FEEDING SYSTEM AND SHELTER TO CREATE A CONTROLLED ENVIRONMENT

CROSS-REFERENCE TO RELATED APPLICATIONS

This application is a Divisional Application of U.S. Ser. No. 11/370,971 filed Mar. 8, 2006, herein incorporated by reference in its entirety.

FIELD OF THE INVENTION

This invention relates to a cattle feeding system and a shelter for use in that system.

BACKGROUND OF THE INVENTION

The present invention relates generally to a cattle feeding system and to a shelter used in that system to create a controlled environment that protects the beef animal from environmental extremes. It also is a system which minimizes pollution risks.

Conventional open cattle feedlots have fence-line feed bunks and a concrete apron in front of the bunk for the cattle to stand on while eating; but, the rest of the dirt feedlot is open to the sun, wind, snow, rain and resulting mud and wind chill. Conventional systems do not protect the beef animal from extreme weather stresses. The associated stresses from the conventional beef system lead to decreased feed efficiency, lower weight-gains, disease development, and higher death loss. In addition, the conventional system is more labor intensive, because the mud lots must be repeatedly scraped and dirt mounds built in an attempt to keep the animals out of the snow and mud. The feed bunks are in the open and unprotected from snow and rain. Snow and spoiled wet feed must be repeatedly scooped out of the bunk to keep the bunk dry. This increases labor expense.

A larger concern for conventional cattle feeding systems is the potential for polluting the environment with manure run-off from the open lots after a rain or snow melt. The Environmental Protection Agency (EPA) is enforcing new rules to prevent the pollution of streams and ditches next to conventional cattle feedlots and is requiring expensive containment basins or lagoons to be built to prevent run off from open feedlots. The result of lagoons and containment basins is the creation of an odor problem from the breakdown of the liquid manure that is contained in them. Consequently, the solution to water pollution creates air pollution. This trade off of one type of pollution for another is not acceptable.

Certain types of systems have been developed in the past in an attempt to control climate and environment for cattle feeding systems. See for example, Slack, U.S. Pat. No. 4,773,191, which relates to a light and climate control system for pre-stressed fabric structures of the type having a plurality of arches in order to create certain zones within the shelter of controlled environment. There is, however, no control of feeding or design to eliminate or minimize manure and air pollution or is there adjustability to weather extremes. Bunger, U.S. Pat. No. 4,222,347, relates to a more permanent animal shelter for large scale feed operations involving a specifically designed roof and louver section with ventilation areas and use of interior feeding troughs. This too does nothing to eliminate some of the water and air pollution risk, nor does it allow flexibility of change in shelter structure to reflect change in environmental condition. It can therefore be seen by these two examples alone that there is a continuing need for improvement in large cattle feeding systems and shelters used in those systems to create a controlled environment depending upon the weather conditions, and to minimize pollution risk of both liquid and air pollution.

A primary objective of the present invention is to develop a beef system that may be used to feed cattle in a controlled environment without the associated pollution of water and air that conventional cattle feeding systems create with their manure runoff.

Another objective of the present invention is to develop such a system which allows the walls of the shelter to be modified from opened to closed to partially closed positions and from positions providing shade protection to no shade protection, all in order to appropriately respond to seasonal climate changes as needed for the comfort of the cattle dwelling within the shelter.

A yet further objective of the present invention is to provide a cattle feeding system and a shelter which can be built relatively inexpensively in comparison with other units presently available commercially but which provides variable climate adjustments.

Simulating cattle feeding in a controlled environment is not an easy endeavor. Particularly in the Mid-West climates, which may typically range from winter wind chills approaching −35° F. to summer heat indexes of +114° F. Accordingly, it is a further objective of the present invention to provide a controlled environment that will modify the extreme weather fluctuations to a thermal neutral environment where the beef animal can thrive.

Open cattle feedlots are further complicated with humane animal husbandry criteria; such as providing access to bedding to provide a dry comfortable area for the cattle to lie on and be protected from the sun, cold, wind, rain and mud. Accordingly, an even further objective of the present invention is to provide a cattle-feeding system that incorporates general humane, on farm husbandry standards for cattle.

Open cattle feedlots are often used by large commercial feedlots. These large feedlots are not typically inclined to use a controlled environment. A family farmer who owns the cattle, depends upon the farm for his/her livelihood, and provides the daily physical labor to manage the cattle and farm operation; such a person is more likely to adopt controlled environment, humane on-farm husbandry. Accordingly, it is a still further objective of the present invention to provide a cattle-feeding system, which may be easily adapted for a family farm, so that the family farm may generate a good and profitable livelihood.

Conventional cattle feeding systems usually have several hundred cattle in a pen and may not have adequate bunk and water space so that cattle, a herd animal, can all have easy access to water and feed. Accordingly, yet another objective of the present invention is to provide adequate space requirements for cattle if they are not in an open feedlot area but in an enclosed building structure. The present system generally provides 40 square feet per animal, with the feed bunk and water included, which is double the space of many current confined feeding systems on slatted floors.

These and other objectives will become apparent from the following detailed written description of the invention, including the preferred embodiment and best mode of the invention.

BRIEF SUMMARY OF THE INVENTION

In accordance with the present invention, an improved cattle feeding system and shelter are provided. The shelter has a building foundation frame extending upwardly from the ground with an awning frame extending upwardly from the foundation frame and over it. The awning frame allows for an awning to be placed over it to at least partially enclose the shelter. The awning has a portion which is optionally opened to the south and optionally opened to the north to selectively allow air ventilation, wind protection or catching the warmth of a southern sun exposure. The awning frame also has a portion that extends outwardly to the south over the foundation frame to support an extendable and retractable awning that may hang over the south facing foundation frame to provide shade or be drawn up in a retracted position to allow the sun to enter for warmth. Vertically extendable and retractable awning closures are over the east and west ends of the frame to form selectively open and closed entrances and exits. The entire system is built on a partial cement floor of a configuration which enhances cleanliness inside of the shelter and minimizes pollution outside of the shelter.

DETAILED DESCRIPTION OF THE PREFERRED EMBODIMENT

Figure 1:
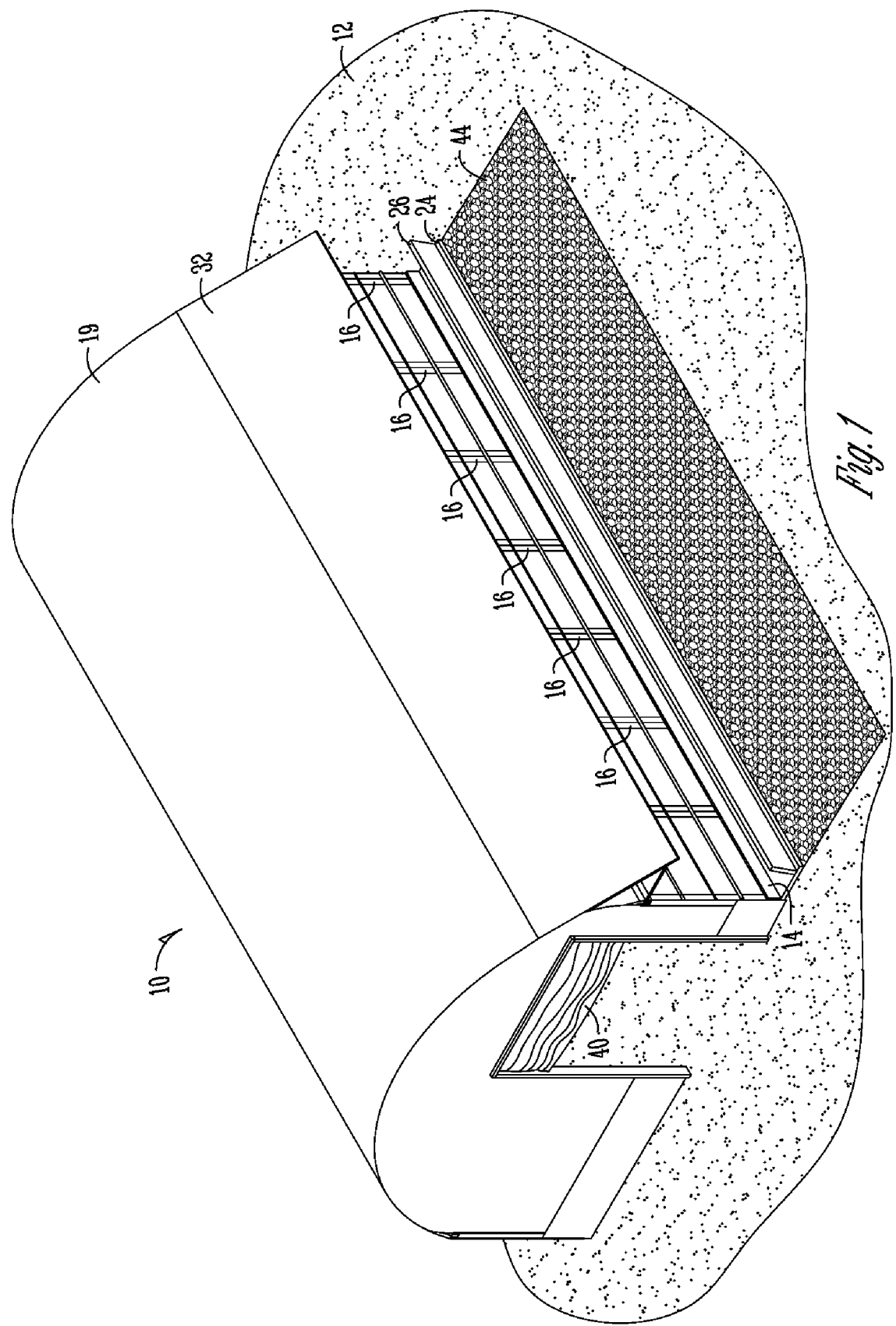
FIG. 1 is a perspective view of a south facing side of a cattle feeding shelter of the present invention.

The beef shelter system of the present invention creates a controlled environment that incorporates and utilizes the cattle's natural behavior and instincts. These behaviors and instincts include:

to seek shade away from summer sun;

to seek out wind protection to prevent wind chill;

to keep their hair coats dry (no snow or chilling rain);

to stay off frozen lumpy ground (no bruised hooves and lameness);

to stay out of the mud (no foot rot or hair damage);

to lie down on a dry bedding pack (no bruising or pressure sores);

to have easy access to feed;

to have easy access to water;

to be free from flies;

to stay in small groups;

to seek a quiet protected area to rest and ruminate;

to seek a concrete free area to stand (prevent hoof and leg stress); and to seek to defecate and urinate away from feed and water.

The shelter system has a roof over the entire cattle feeding area to prevent manure runoff resulting from rainfall or snow melt.

Certain constructional and operational features, both individually and in various combinations, are worthy of specific mention before describing in detail the specific construction shown in the drawings. These features emphasize the flexible uses of the system.

According to one feature of the invention, the system provides a roof over the entire cattle feeding area so that the manure can be handled in a dry state to prevent odor and runoff that are a result of liquid manure. The system also provides a roof over the entire cattle feeding area to provide shade from the summer sun and also provides a roof over the entire cattle feeding area to keep the cattle free from rain and snow to keep their hair coat dry. The system roof also prevents the wet conditions that contribute to hatching of fly eggs and the resultant fly problems for the cattle and the surrounding area.

According to another aspect of the present invention, it is worthy to note the structure does not have to be heated or insulated.

According to another aspect of the present invention, the frame structure is placed 10' above the floor on 6"×6"×14' posts anchored 4' in the ground. This allows for maximum ventilation and freedom from moisture condensing on the ceiling.

According to another aspect of the present invention, the frame structure runs east and west and is open to the south. This allows the winter sun to stream in on the open 10' high south side. This allows the cattle to stand in the warm sunshine and keeps the 12' concrete pad along the feed bunk from freezing. In the summer time with the sun in its north axis, the cattle have complete shade and the 10' high south opening allows maximum ventilation.

Preferably, the frame system has a 5' rollup curtain on the west, north and east side that is down in the winter to prevent wind chill, and rolled up in the summer to allow maximum air movement to prevent heat stress.

According to another aspect of the present invention, the system has a 1' opening in the top of the roof in the center 100' of the building to allow the heat and moisture to vent out the top. This will prevent steam and moisture from collecting in the hoop frame structure.

According to another aspect of the present invention, the shelter has a 4' awning as part of the roof on the south side that extends out over the feed bunk to prevent snow and rain from falling in the bunk and spoiling feed.

According to another aspect of the present invention, the shelter has two 16' wide×14' high rollup doors located on the west and east side of the building. This allows easy access to the structure for bedding the pens and for cleaning the pens.

According to another aspect of the present invention, the hoop frame shelter system uses steel 5' high pipe gates to safely separate pens of cattle and to allow easy access to move cattle into and out of the structure.

According to another aspect of the present invention, the hoop frame shelter system has water tanks located in the structure so that all cattle have easy access to protected water.

According to another aspect of the present invention, the hoop frame shelter system has pens that are 75' wide to keep the cattle in small 75 head groups.

According to another aspect of the present invention, the hoop frame shelter system provides 1' of bunk space for each animal and the bunk is 3' wide to allow adequate feed capacity.

According to another aspect of the present invention, the hoop frame shelter system provide a 6" high step in front of the feed bunk to prevent dunging in the bunk.

According to another aspect of the present invention, the hoop frame shelter system provides a 4' wide area of concrete that slopes away from feed bunk with a 2" slope that allows the cattle hoof action to scrape the manure down to the 8' level adjoining concrete slab.

According to another aspect of the present invention, the hoop frame shelter system provides an 8' wide area of level concrete between the 4' sloped concrete and the dry bedding pack. This level concrete is easily cleaned with a tractor scraper to keep manure from building up in the structure. This concrete pad is scraped clean and the manure is removed from the building to the compost pile about once every 10 days. The pen gating and the rollup doors on the ends of the structure allow this to be a very easy procedure.

According to another aspect of the present invention, the hoop frame shelter system uses 2⅜" pipe as bunk headers to allow cattle safe access to the feed bunk.

According to another aspect of the present invention, the hoop frame shelter system uses 1" sucker rod located 1' above the bunk header pipe to prevent cattle from jumping over and into the feed bunk.

According to another aspect of the present invention, the hoop frame shelter system uses Ag lime #3 to be placed over the 24' wide ground area 4" deep to seal the ground from manure penetration and to act as a moisture barrier to keep the bedding pack dry.

According to another aspect of the present invention, the hoop frame shelter system uses straw, corn stover and bean stover as bedding above the limestone layer. Approximately ½ of a 1200# round bale of bedding is required for each animal during a 100 day feeding period.

According to another aspect of the present invention, the hoop frame shelter system's bedding pack is removed with a front end loader after each pen of cattle have been marketed. The bedding pack will make a dry compost and can be stacked outside the structure in a compost pile until the farmer has crop ground available to spread the dry odor free fertilizer.

According to another aspect of the present invention, the hoop frame shelter system uses the bedding compost pile to compost any dead animal as fly-free, odor-free compost that can later be spread on crop ground as composted fertilizer.

Each of the previously discussed features and aspects are variable options that can be used singly or in combination with some or all of the other mentioned features to provide maximum operator flexibility.

Referring now more particularly to the drawings by character reference, FIG. 1 discloses the animal shelter 10 looking at a perspective view of the south facing side. The shelter 10 is generally positioned on the ground 12 and comprises a wooden foundation perimeter frame 14 which has spaced apart frame beams 16 extending upwardly from the ground about 10'. Frame posts or beams 16 are anchored 4' into the ground. This 10' spacing allows for maximum ventilation and freedom from moisture condensing on the ceiling. A 1' opening 46 in the top of roof in the center of the building to allow the heat and moisture to vent out the top.

Figure 4:
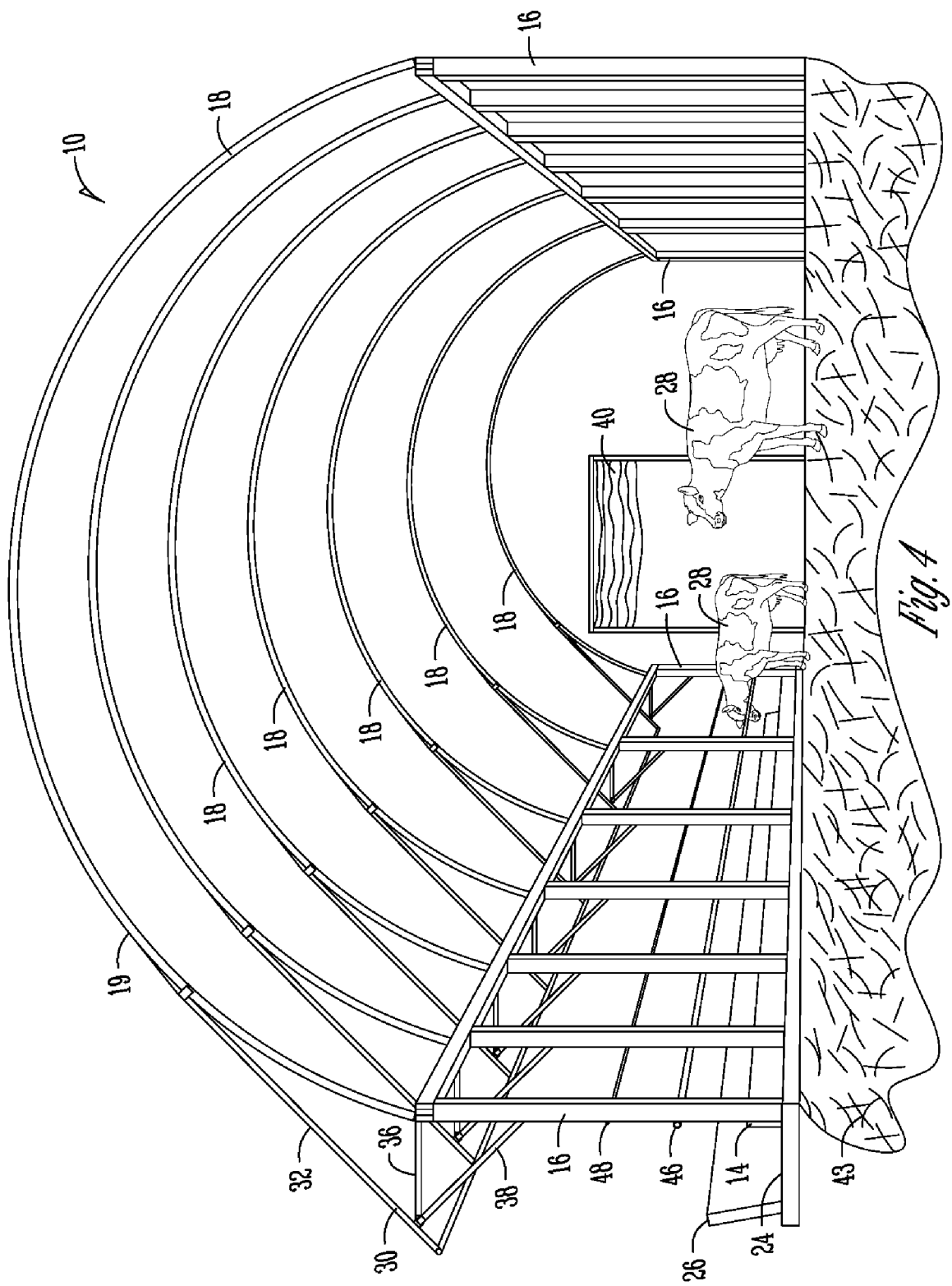
FIG. 4 is an end view looking through the shelter from west to east showing the north end enclosed and the south end open.
Figure 5:
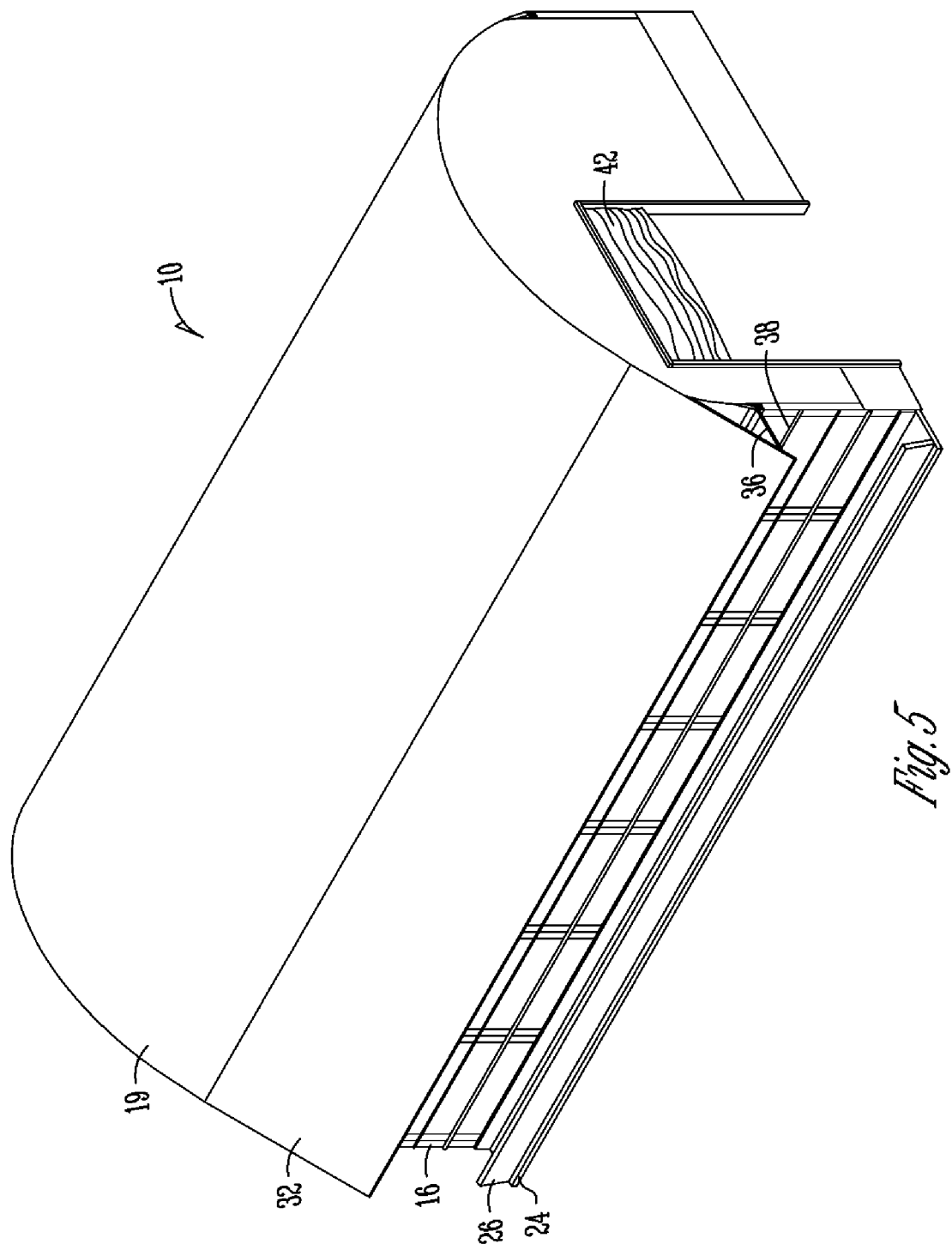
FIG. 5 is a perspective view of the south facing wall and showing the associated animal feed bunker, as well as the west end.

Frame beams or posts 16 have a hoop awning structure frame 18 extending upwardly from the frame beams 16 and over the top to form an awning frame extending from the south side up and across over to the north side corresponding frame beams 16. Covering 19 is extended over the awning frame and secured to it by any suitable means such as ties, snaps, hooks, etc. The covering 19 can be a material such as canvas or flexible polymer plastics like polyvinyl chloride, polyester, coated or uncoated. Wooden frame 14 is anchored to a substantially flat (on the interior portion) cement floor or concrete slab 20. In a preferred embodiment, concrete slab 20 has an interior flat portion and extends to a sloped interior portion 22 which terminates in a stepped up exterior flat portion 24. Preferably this step is 6" (see FIG. 2). This prevents animals from defecating into the feed box or bunker 26 as earlier explained. Feed bunker 26 is attached to the exterior portion of frame beams 16 along the outside of the beams. In this manner, animals 28 inside of the shelter 10 can stick their heads out facing south and feed from the feed bunker 26 (see FIG. 4).

Figure 6:
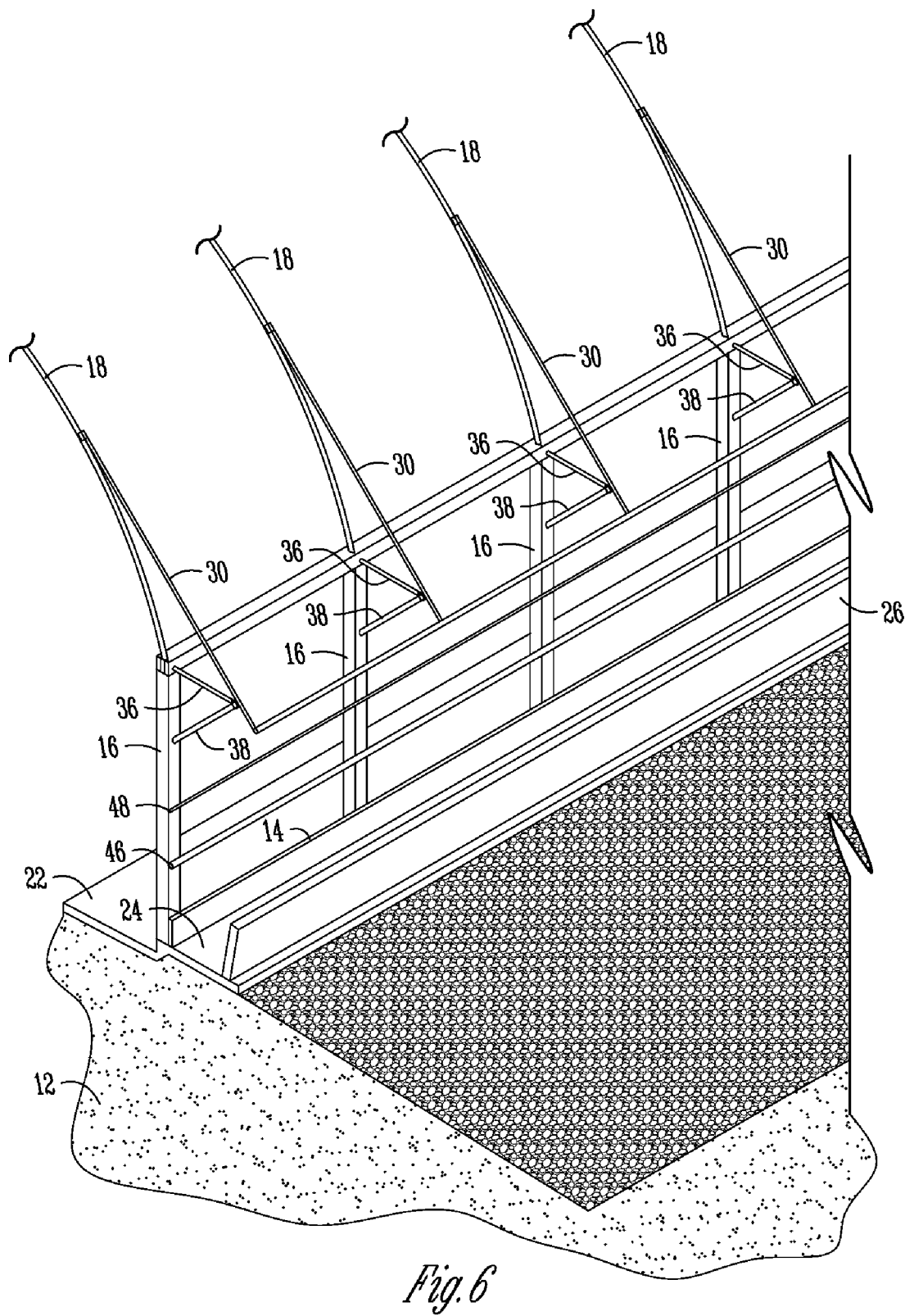
FIG. 6 shows a perspective view of the awning frame extension over the south facing wall.
Figure 7:
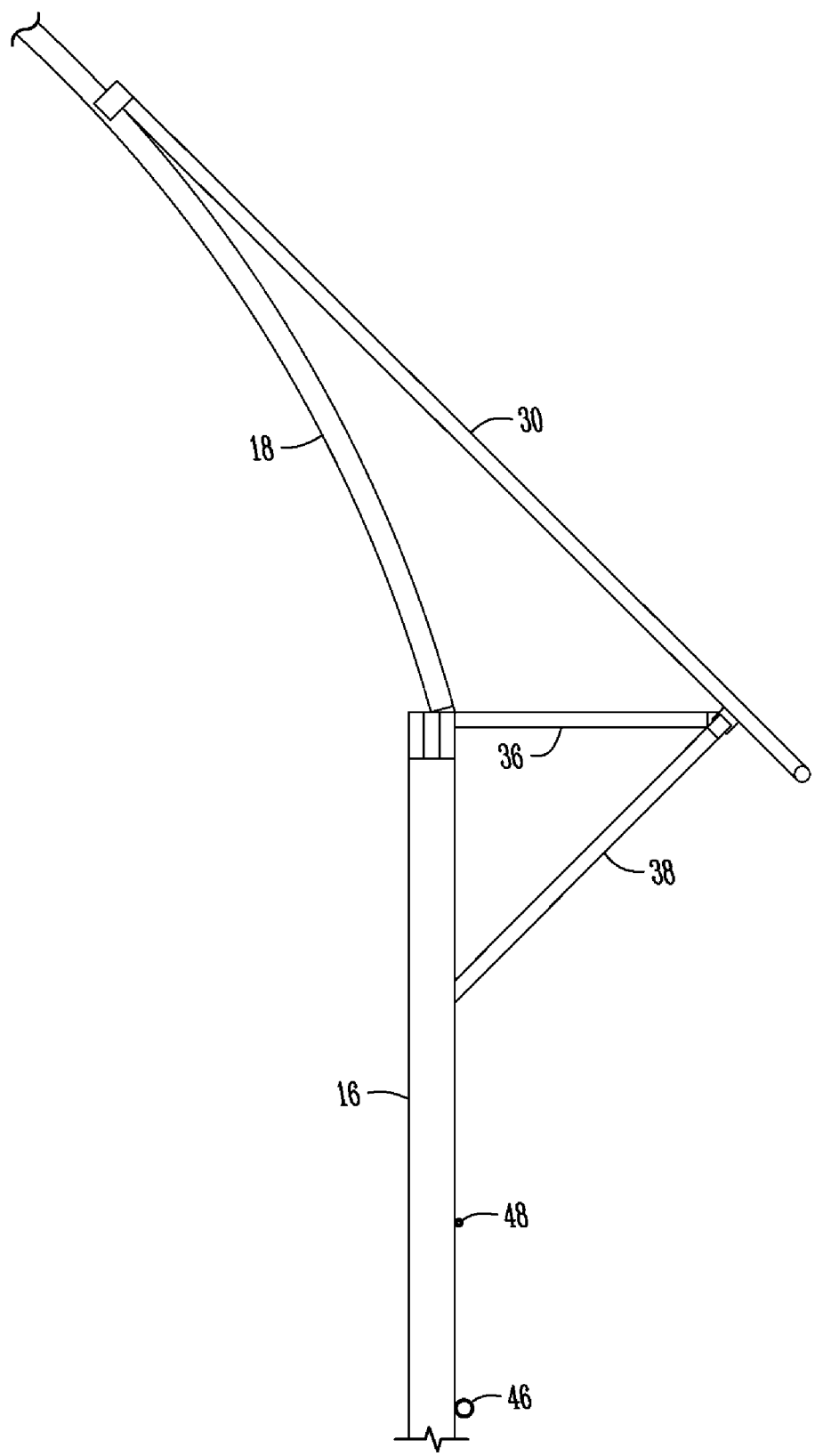
FIG. 7 shows a close-up end view of the details of the south facing retractable awning's frame.

Again looking at the south side (see FIG. 6), the awning frame 30 extends out from the awning hoop structure 18 and over the feed bunker 26. The awning 32 positioned on awning frame 30 is a 4' awning which actually is part of the roof on the south side and extends over the feed bunk to prevent snow and rain from falling in the feed bunk and spoiling feed. Awning frame 30 has support stints 36 and 38. In the summer the awning 32 also functions to provide shade. In the winter, it may be rolled up to provide sun into the south side for warmth. The north side also has a vertical rollup cover 39 positioned vertically up to the 10' level which may be rolled or unrolled selectively to provide warmth when it is down and ventilation when it is up. The east and west ends have two 16' wide by 14' high rollup doors 40 and 42 to allow easy access to the structure. Bedding material (not depicted) may be placed on the limestone floor 45. The doors 40 and 42 may be rolled up for scooping or cleaning with a front end loader after each pen of cattle has been sent to market. Scooped out bedding material will make a dry compost that can be stacked outside of the structure for a compost pile available to spread on crop ground.

Figure 2:
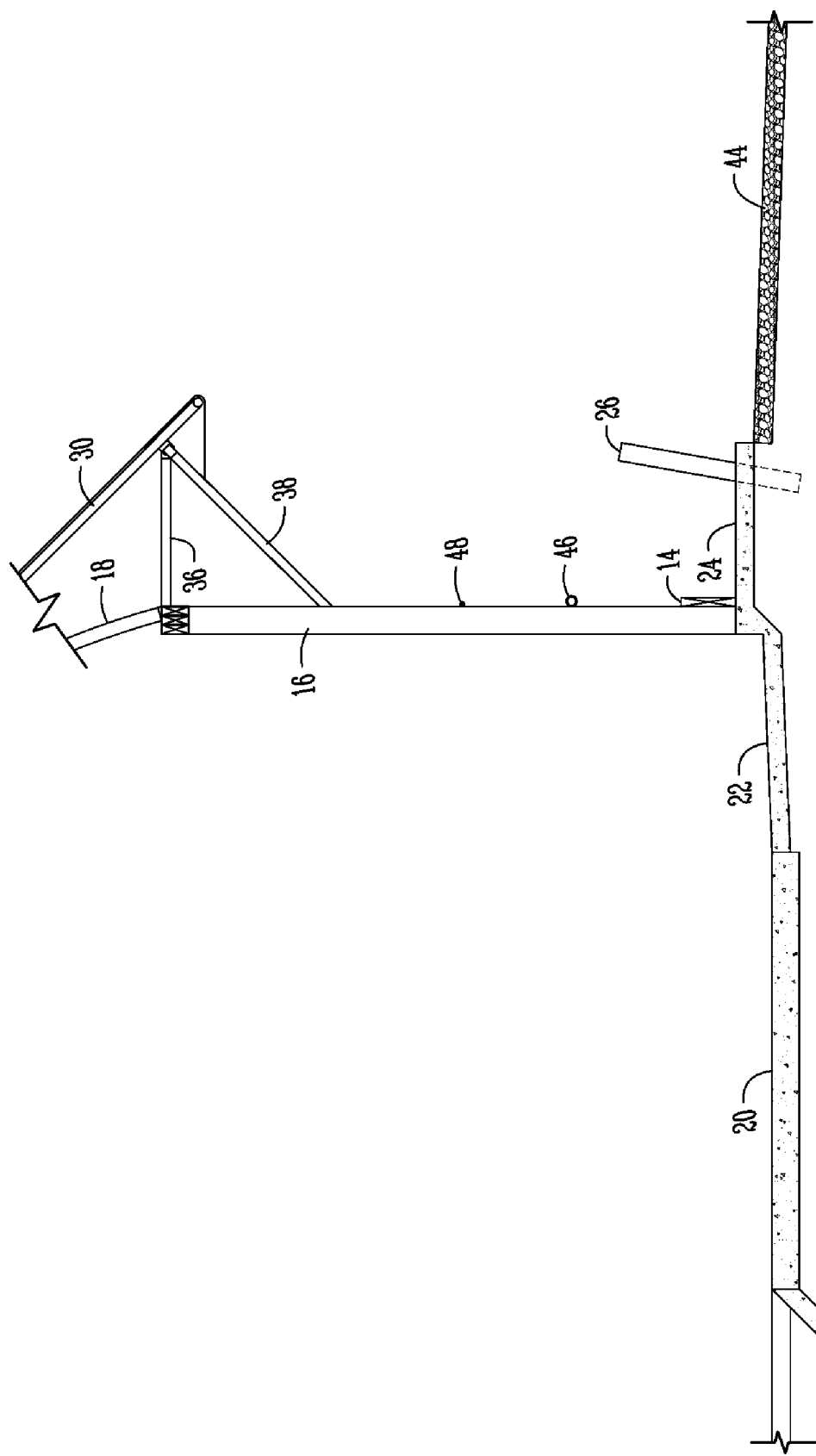
FIG. 2 is a sectional view through the south wall of the shelter of FIG. 1.
Figure 3:
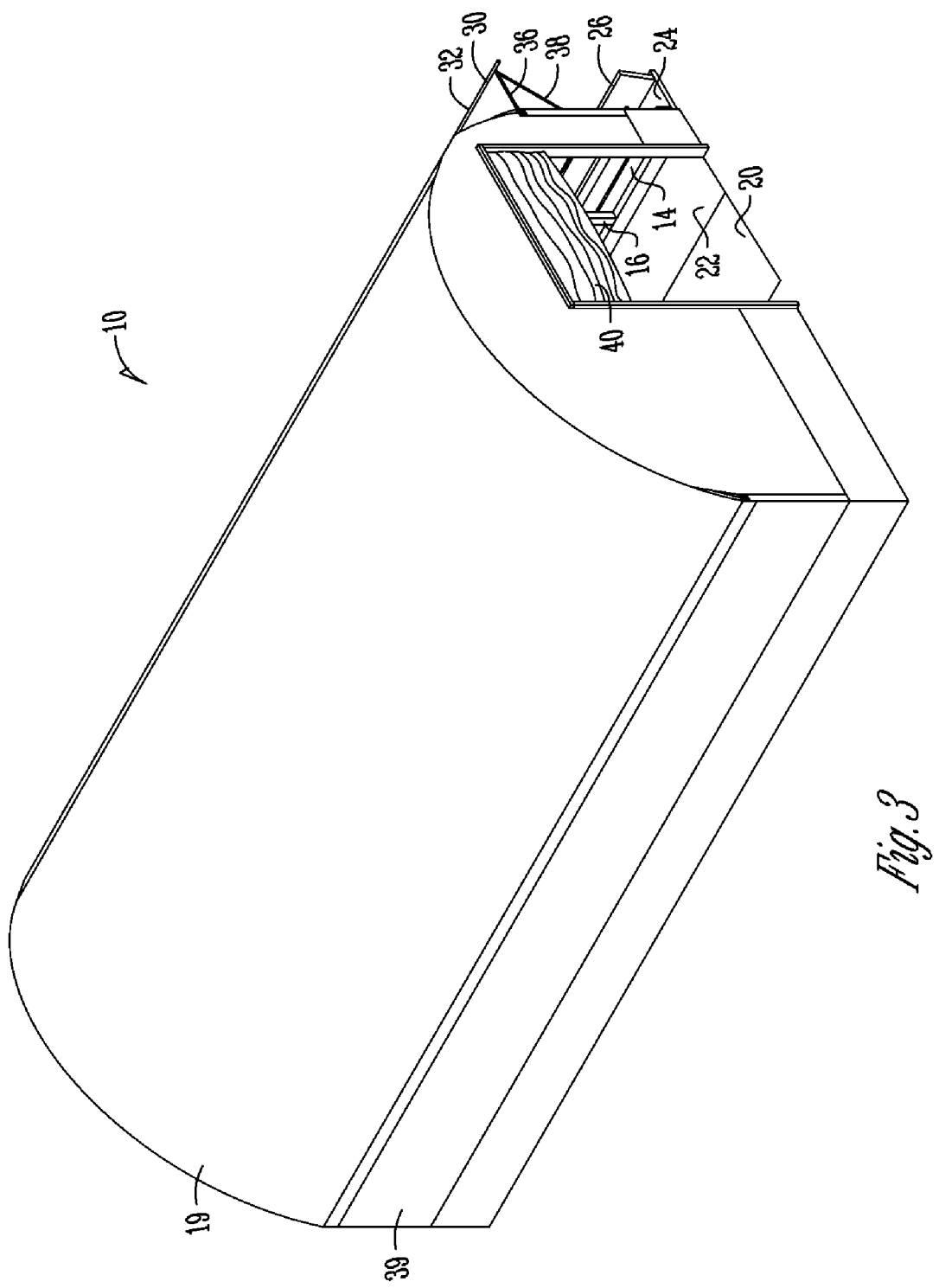
FIG. 3 is a perspective view showing the east facing end looking through and out the south facing end.

Certain constructional features relating to the position of the shelter 10 on the ground are worthy of consideration and mentioned herein. As seen in FIG. 2, agricultural limestone 45 is placed over a 24' wide ground area 4' deep in the building to seal the ground from manure penetration and to act as a moisture barrier to keep the bedding pack dry. The system uses straw, corn stover, and bean stover as bedding above the limestone layer. Bunk header pipe 46 is attached to frame posts 16 to allow cattle safe access to the feed bunk 26, and sucker rod 48 is positioned about one foot above header pipe 46 to prevent cattle into the feed bunk 26. Crushed rock 44 is placed 10 ft wide in front of bunk for a feed truck to drive on to deliver feed to the feed bunk 26.

It can be seen that the hoop frame system creates a controlled environment. The hoop frame system has a roof providing protection from the weather elements. The system has rollup curtains for ventilation in summer and they are rolled down for protection from wind chill in winter. The system has feed bunks, waters, bedding pack and concrete scrape alley under one roof. The system has gating and rollup doors to allow access for bedding, cleaning and moving cattle. The method utilizes the steps in a hoop frame system that promotes cattle to utilize their natural instincts to seek shade, to seek out wind protection, to keep their hair coat dry, to stay off frozen lumpy ground, to lie down on a dry bedding pack, to stay in small groups and to seek a quiet protected area to ruminate and rest. The hoop frame shelter system allows cattle to be fed in a controlled environment without the associated pollution of water and air that open feedlots create with manure runoff from rain and snow melt. It therefore can be seen it accomplishes all of its intended objects.

What is claimed is:

1. A method of providing an environmentally friendly cattle feeding system, comprising: positioning a hoop and frame structure on the ground that allows selective opening and closing to the north for allowing selective ventilation, wind protection or catching the warmth of southern sun exposure to the south; placing an adjustable flexible covering over the frame structure; providing an adjustable awning associated with the south portion of the hoop and frame structure; selectively adjusting the north portion of the flexible covering by rolling up or letting down the flexible covering; providing east and west end entrance and exits to the structure and flexible covering which may be opened or closed; providing a feed bunker positioned under the adjustable awning for protection over the feed bunker; and selectively adjusting the adjustable awning by extending the adjustable awning to shade and protect the feed bunker, or by retracting the adjustable awning for access to warmth of southern sun exposure.

2. The method of claim 1 wherein the flexible covering material is selected from the group consisting of canvas and flexible polymeric plastic materials.

3. The method of claim 2 wherein the flexible covering is a polymeric plastic material selected from the group consisting of polyvinyl chloride, polyester and coated polymer materials.

4. The method of claim 1 wherein the flexible covering has a ventilation hole to vent air and moisture.

5. The method of claim 1 wherein the frame structure is of sufficient width to define a long open alley between the north and south walls which can be cleaned of dirty bedding material by a tractor front end loader combination by simply pushing used bedding material out of the building.

* * * * *